(12) United States Patent
Plisko et al.

(10) Patent No.: US 10,437,787 B2
(45) Date of Patent: Oct. 8, 2019

(54) COMPARISON OF FILE SYSTEM SNAPSHOTS STORED IN A REMOTE STORAGE SYSTEM USING A NETWORK FILE SYSTEM COMMAND

(71) Applicant: Infinidat LTD., Herzliya (IL)

(72) Inventors: Cyril Plisko, Petah Tikvah (IL); Alexander Goldberg, Rehovot (IL); Leon Kull, Yehud (IL)

(73) Assignee: .INFINIDAT LTD, Herzlia (IL)

( * ) Notice: Subject to any disclaimer, the term of this patent is extended or adjusted under 35 U.S.C. 154(b) by 608 days.

(21) Appl. No.: 14/088,401

(22) Filed: Nov. 24, 2013

(65) Prior Publication Data

US 2015/0149411 A1    May 28, 2015

(51) Int. Cl.
*G06F 16/178*    (2019.01)
(52) U.S. Cl.
CPC ................ *G06F 16/178* (2019.01)
(58) Field of Classification Search
USPC .......................................... 707/639
See application file for complete search history.

(56) References Cited

U.S. PATENT DOCUMENTS

| | | | | |
|---|---|---|---|---|
| 7,076,509 B1 * | 7/2006 | Chen | | G06F 3/0605 |
| 7,356,679 B1 * | 4/2008 | Le | | G06F 17/30067 |
| | | | | 707/E17.01 |
| 7,818,299 B1 * | 10/2010 | Federwisch | | G06F 11/2066 |
| | | | | 707/620 |
| 8,117,158 B1 * | 2/2012 | Chatterjee | | G06F 11/1451 |
| | | | | 707/638 |
| 8,412,688 B1 * | 4/2013 | Armangau | | G06F 17/30088 |
| | | | | 707/690 |
| 2009/0319653 A1 * | 12/2009 | Lorenz | | G06F 11/1433 |
| | | | | 709/224 |
| 2013/0054888 A1 * | 2/2013 | Bhat | | G06F 3/0604 |
| | | | | 711/114 |
| 2014/0006731 A1 * | 1/2014 | Uluski et al. | | 711/155 |
| 2015/0081994 A1 * | 3/2015 | Christopher et al. | | 711/162 |

* cited by examiner

*Primary Examiner* — Sherief Badawi
*Assistant Examiner* — Raheem Hoffler
(74) *Attorney, Agent, or Firm* — Reches Patents

(57) ABSTRACT

A method for performing a comparison between first and second points in time snapshots of a file system entity, the method may include: (I) receiving by a storage system a command that was sent from a host computer, the command is network file system protocol compliant, wherein the command comprises (i) an operation code, and (ii) information about a virtual path, the virtual path that comprises (ii.a) first fields that comprise snapshot comparison parameters indicative of the first and second points in time snapshots of the file system entity, and (ii.b) a second field of a content that indicates that the command is a request to compare between the first and second points in time snapshots of the file system entity; (II) identifying, by a file system application hosted by the storage system and in response to the content of the second field of the virtual path, the command as including a request to compare between the first and second points in time snapshots of the file system entity; (III) comparing by the file system application the first and second points in time snapshots of the file system entity to provide a comparison result that is network file system protocol compliant; and (IV) sending by the storage system the comparison result to the host computer.

21 Claims, 3 Drawing Sheets

COMPARISON OF FILE SYSTEM SNAPSHOTS STORED IN A REMOTE STORAGE SYSTEM USING A NETWORK FILE SYSTEM COMMAND

BACKGROUND

Various file system utilities require information with regard to changes that occurred in the file system between two points in time. Some examples of such utilities include: incremental backup, asynchronous remote mirroring, virus scanning, and many more. Snapshots are often used for capturing the state and content of the file system in certain points in time. The changes made to data and metadata of objects (e.g., directories, files) of the file system between two points in time can be determined by comparing the two snapshots that were respectively taken in these two points in time. The differences between two snapshots are also of interest for users of the file system when manually scoping, auditing and looking for potential malicious and/or unauthorized accesses that may occurred between the two snapshots.

ZFS (an open source file system) provides a utility for reporting changes that occurred between two snapshots of a file system, one is an older snapshot and the second is a newer snapshot.

The reported changes that were made in the file system may include: files and directories that were added (i.e., appear only in the newer snapshot), files and directories that were removed (appear only in the older snapshot), files and directories that were modified between the older and newer snapshots, files and directories that were renamed between the older and newer snapshots and more.

Some Unix based Operating Systems (e.g., Solaris, FreeBSD) that employ ZFS as the underlying file system, provide access to the ZFS utility for comparing snapshots, by enabling a user to use the line command 'zfs diff'. For example, for comparing an earlier snapshot named 'snap1' with a later snapshot named 'snap2' and for reporting the changes that occurred under a certain directory or sub-tree (e.g. all changes under 'dir1' and it sub-directories), the following command-line can be typed: zfs diff/dir1/snap1/dir1/snap2.

The displayed result includes a list of changes with a new line for each file or directory that has undergone a change between the first snapshot ('snap1') and the second snapshot ('snap2'), the type of change and the name of the file or directory.

Assuming that dir2 is a directory under dir1 and that out of all directories under dir1 only dir2 was changed between the snapshots—then the list of changes may include, for example, the following lines:
M/dir1/dir2/
+/dir1/dir2/fileA
−/dir1/dir2/fileD
R/dir1/dir2/fileB->/dir1/dir2/fileC The line starting with 'M' (Modify) indicates that directory dir2 has been changed between the creation of snap1 and the creation of snap2.

The line starting with '+' indicates that fileA was added between snap1 and snap2 (i.e., fileA exists in snap2 and does not exist in snap1).

The line starting with '−' indicates that fileD was deleted between the two snapshots (i.e., exists in snap1 and does not exist in snap2).

The line starting with 'R' indicates that the name of a file named as 'fileB' in snap1 was changed to 'fileC' in snap2.

Snapshot comparison commands (such as diff-command) can be used by a user to compare snapshots that are managed by the user host computer.

There is a need to allow users to perform a snapshot comparison in cases where such users do not have access to comparing utilities provided by the local operating system or by the underlying file system.

When a user accesses a filesystem hosted by a file-server or a storage system implementing a file-server, the network file system (NAS) protocol used for interfacing such file-system does not support using a snapshot comparison command and therefore, even if the file-server includes a snapshot comparison utility, the access to the snapshot comparison utility is not available for the end-user. Non-limiting examples of such network file system protocols are Network File System (NFS) and Common Internet File System (CIFS).

SUMMARY

According to an embodiment of the invention there may be provided a method for performing a comparison between first and second points in time snapshots of a file system entity, the method may include: receiving by a storage system a command that was sent from a host computer, the command is network file system protocol compliant, wherein the command may include (i) an operation code, and (ii) information about a virtual path, the virtual path that may include (ii.a) first fields that may include snapshot comparison parameters indicative of the first and second points in time snapshots of the file system entity, and (ii.b) a second field of a content that indicates that the command is a request to compare between the first and second points in time snapshots of the file system entity; identifying, by a file system application hosted by the storage system and in response to the content of the second field of the virtual path, the command as including a request to compare between the first and second points in time snapshots of the file system entity; comparing by the file system application the first and second points in time snapshots of the file system entity to provide a comparison result that is network file system protocol compliant; and sending by the storage system the comparison result to the host computer.

The network file protocol may not include a snapshot comparison operation code for requesting a comparison between different points in time snapshots of the file system entity.

The method may include ignoring the operation code of the command.

The comparison result may embed a text file.

The file system entity may be the file system.

The file system entity may be a directory of the file system.

The method may include receiving by the storage system multiple commands that were sent from the host computer, each of the multiple commands is network file system protocol compliant, wherein each of the multiple commands may include an operation code, and wherein the information about the virtual path is distributed between the multiple commands.

According to an embodiment of the invention there may be provided a non-transitory computer readable medium that stores instructions that once executed by the computer cause the computer of a storage system to execute the stages of: receiving a command that was sent from a host computer to a storage system, the command is network file system protocol compliant, wherein command may include (i) an operational code, and (ii) information about a virtual path that may include (ii.a) first fields that may include snapshot comparison parameters indicative of the first and second points in time snapshots of the file system entity, and (ii.b) a second field of a content that indicates that the command is a request to compare between the first and second points in time snapshots of the file system entity; identifying, in response to the content of the second field of the virtual path, the command as including a request to compare between the first and second points in time snapshots of the file system entity; comparing by the file system application the first and second points in time snapshots of the file system entity to provide a comparison result that is network file system protocol compliant; and sending the comparison result to the user device.

The network file protocol may not include a snapshot comparison operation code for requesting a comparison between different points in time snapshots of the file system entity.

The non-transitory computer readable medium may store instructions for ignoring the operation code of the command.

The comparison result may embed a text file.

The file system entity may be the file system.

The file system entity may be a directory of the file system

The non-transitory computer readable medium may store instructions for receiving multiple commands that were sent from the host computer, each of the multiple commands is network file system protocol compliant, wherein each of the multiple commands may include an operation code, and wherein the information about the virtual path is distributed between the multiple commands.

According to an embodiment of the invention there may be provided a storage system that may include: a file system interface that is arranged to receive a command that was sent from a host computer to a storage system, the command is network file system protocol compliant, wherein command may include (i) an operational code, and (ii) information about a virtual path that may include (ii.a) first fields that may include snapshot comparison parameters indicative of the first and second points in time snapshots of the file system entity, and (ii.b) a second field of a content that indicates that the command is a request to compare between the first and second points in time snapshots of the file system entity; and a computer that is arranged to: identify, in response to the content of the second field of the virtual path, the command as including a request to compare between the first and second points in time snapshots of the file system entity; compare the first and second points in time snapshots of the file system entity to provide a comparison result that is network file system protocol compliant; and wherein the file system interface is further arranged to send the comparison result to the user device.

The network file protocol may not include a snapshot comparison operation code for requesting a comparison between different points in time snapshots of the file system entity.

The computer may be arranged to ignore the operation code of the command.

The comparison result may embed a text file.

The file system entity may be the file system.

The file system entity may be a directory of the file system.

The file system interface may be arranged to receive multiple commands that were sent from the host computer, each of the multiple commands is network file system protocol compliant, wherein each of the multiple commands may include an operation code, and wherein the information about the virtual path is distributed between the multiple commands. The computer can be arranged to reconstruct or define the virtual path in response to the content of the multiple commands.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
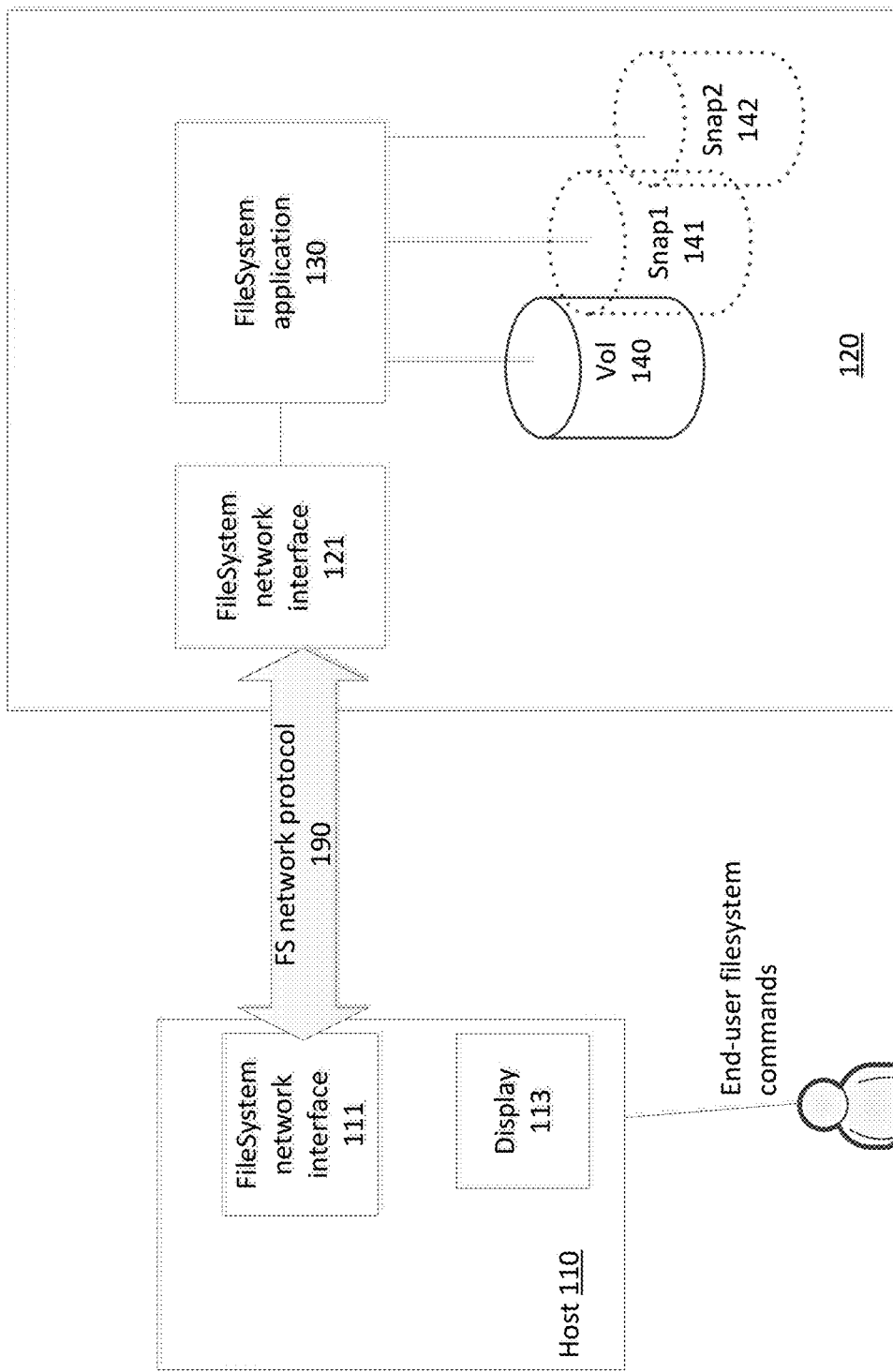
FIG. 1 illustrates a host computer and a storage system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The term "user" or "end-user" refers to a user that is not an administrator and/or does not have administrator permissions and/or does not have access to a management station or any management interface (e.g. accessing the storage system via a web-interface or via a proprietary management protocol or any other management protocol that enables using control commands (non-I/O commands) for managing volumes and snapshots).

FIG. 1 illustrates a host computer 110 and a storage system 120 according to an embodiment of the invention.

FIG. 1 illustrates a storage system 120 that is connected to one or more host computers, such as host computer 110. Storage system 120 provides file services to host 110 and includes a file system application 130 that manages at least one volume 140 that includes all the data and metadata of a file system, including data and metadata of files, directories and snapshots, such as snapshots 141 and 142 that are images of volume 140 in two different points in time. Storage system 120 may be a file-server.

Storage system 120 is coupled to host computer 110 via a network that supports a network file system protocol 190. Host computer 110 enables an end-user 115 to access data and metadata stored in storage system 120, by using means for inputting commands and a display 113 for displaying responses received from storage system 120.

End-user 115 uses a host computer 110 and may not have access and/or may not have access permissions to a management user interface (e.g. a web-interface for communicating the storage system via the WEB, which may be implemented with an aid of a GUI) that is generally used by a host administrator or system administrator for managing storage resources, such as volumes and snapshots (e.g., create/delete a resource, restore, mount).

End-user 115 can enter end-user file system commands, which are commands for accessing data and metadata of files and may be line-commands. End-user 115 may be permitted to access only certain file systems or part thereof.

Host computer 110 translates the end-user file system commands into network file system commands, which are messages complies with a file-system protocol 190 carried over the network, such as NFS or CIFS (the latter is also known as Server Message Block (SMB)). Storage system 120 transmits the responses for the network file system commands using the same file-system protocol 190.

File system network interface 111 in host computer 110 and file system network interface 121 in storage system 120 implement the file-system protocol agreed between host computer 110 and storage system 120.

According to embodiments of the invention, end-user 115 can compare between snapshots (such as snapshots 141 and 142) stored in the storage system 120 by using standard end-user file system commands (e.g., read data from a file, read attributes of directories, etc.) that are usually used for accessing objects (files or directories) of the file system and thus end-user 115 is not required to have access to a special management interface nor does he need to be a system administrator with admin's access rights. End-user 115 can request the comparison only for a file system or a portion of a file system to which he have access permissions, i.e. those file systems or a portion thereof that he can access using end-user file system commands.

End-user 115 can use a standard end-user file system command that includes two identifiers of two snapshots to be compared, embedded within the command, e.g. as a virtual directory path. The end-user file system command that can be used for the snapshot comparison may be a command that is usually used for reading/displaying the content of a file (e.g., 'type' or 'copy' in Windows shell, 'cat' in UNIX/Linux) but other commands can be used as well, such as commands for reading content of a directory (e.g., 'ls'). If a command for displaying file content is utilized, e.g. 'cat'-command of UNIX, the line-command can be used with the following format:

cat/snapcomp/snap1/snap2

Where 'snapcomp' is a virtual directory and its name (e.g. snapcomp) is a reserved name that indicates that the purpose of the command is not to read a file but to perform a snapshot comparison between the two indicated sub-directories snap1 and snap2, where the first snapshot identifier in the path, snap1, is an identifier of an older snapshot and the second snapshot identifier in the path, snap2, is an identifier of a newer snapshot.

It is noted that "snapcomp" is just a non-limiting example of a file system entity name and that other names can be used—as long as the file system application 130 and the end user are aware of these virtual file system entity names.

In the example above it is assumed that any access request is directed by default to storage system 120 (rather than to another server or to the local client computer) and to a specific filesystem within the storage system. The default can be set by preceding commands, e.g., a mount command for mounting a certain filesystem within the storage system. The mount command establishes a mount-point and then a 'cd' (change directory command) can be used for setting the mount point as the default directory. In case where a mount-command is used (e.g., mount server-name:/filesystem-name/my-filesystem—for setting "/my-filesystem" as the name of the mount point) and the mount point is not set as default (using e.g., by using 'cd'-command), the end-user file system command can further include the mount point in the remote server that is indicative of the addressed file-server (e.g., storage system 120) and the addressed filesystem within the file-server, for example:
cat/my-filesystem/snapcomp/snap1/snap2, wherein 'my-filesystem' is a name of a mount point previously established and is indicative of the server (storage system 120) and the filesystem that includes snap1 and snap2.

For sake of simplicity of explanation, in the following examples, it is assumed that a certain filesystem in storage system 120 is set as the default for subsequent access requests.

In case where the user wants to compare only part, e.g. a sub-tree, of the file system tree, the command can include a directory path that is a mixture of existing directories and the virtual path, for example:

cat/dir1/snapcomp/snap1/snap2/

Where dir1 is a directory that is part of the directory tree of the file system and in this example, precedes the virtual path provided in the command. Alternatively, 'did' can be set as default by e.g., a preceding 'cd'-command' and the 'cat' command can omit the 'dir1' while still addressing the sub-tree under 'dir1'.

In this case, only the objects under directory dir1 will be compared for differences between snap1 and snap2.

The command is translated, by e.g. file system network interface 111, into a standard network file system command using a proper file system protocol. The standard network file system command may be, for example, eREAD from a file, READDIRPLUS (when using NFS protocol, read directory entries along with their metadata) and any other network file system command whose response can encapsulate content of the comparison response.

This translation of the end-user file system command into a network file system command is also performed to any other standard line command entered by end-user 115 and host computer 110 may not be aware of using a virtual directory for performing snapshot comparison.

The network file system command with the virtual directory path is transmitted over the network and received by storage system 120, which identifies (by file system application 130) the virtual directory path as a request for comparing two snapshots.

Storage system 120 further parses the virtual directory path for obtaining the first snapshot (in this example 'snap1') and the second snapshot ('snap2') and activates a snapshot comparison process.

In case of using CIFS as the network file system protocol, the parsing of the virtual directory path is straightforward, as the entire path is included in the command.

In case of using NFS, the file system network interface 111, may generate one or more LOOKUP commands and a read command—for reading snap1 and snap2.

The snapshot comparison process activated by the storage system can be a known in the art process, for example if the storage system employs ZFS for managing files stored in the storage system, ZFS API can be used for accessing the 'diff' utility.

The output of the snapshot comparison process may be a text file that is generated in response to the activation of the snapshot comparison process and includes for each change occurred between the two snapshots: the file or directory path and name, the type of change (new, deleted, updated, renamed, etc.) and optionally the content of the change, e.g. the new name of a renamed file. The file is encapsulated in a standard network file system response, e.g., as response to READ of NFS or CIFS. A standard or a proprietary error message may be sent, for example, in case one of the identifiers of the snapshots are unknown.

The host computer can treat the response as if it is a regular response to a read-file command and display the content of the comparison as it would have display any standard text-file.

Accordingly, the storage system participates in the following process:
A. Receive a network file system command that comprises information about a directory path.
B. Identify that the directory path is a virtual directory path that includes an operation code (=snapshot compare) and one or more parameters (two snapshot identifiers).
C. Instead of responding with the standard response to the network file system command, i.e., searching for an existing file indicated in the virtual path and reading from the existing file—perform the operation indicated in the virtual directory path (comparing the 2 snapshots).
D. Utilizing a response message (preferably one that can include information) to the network file system command for carrying the result of the operation.

Figure 2:
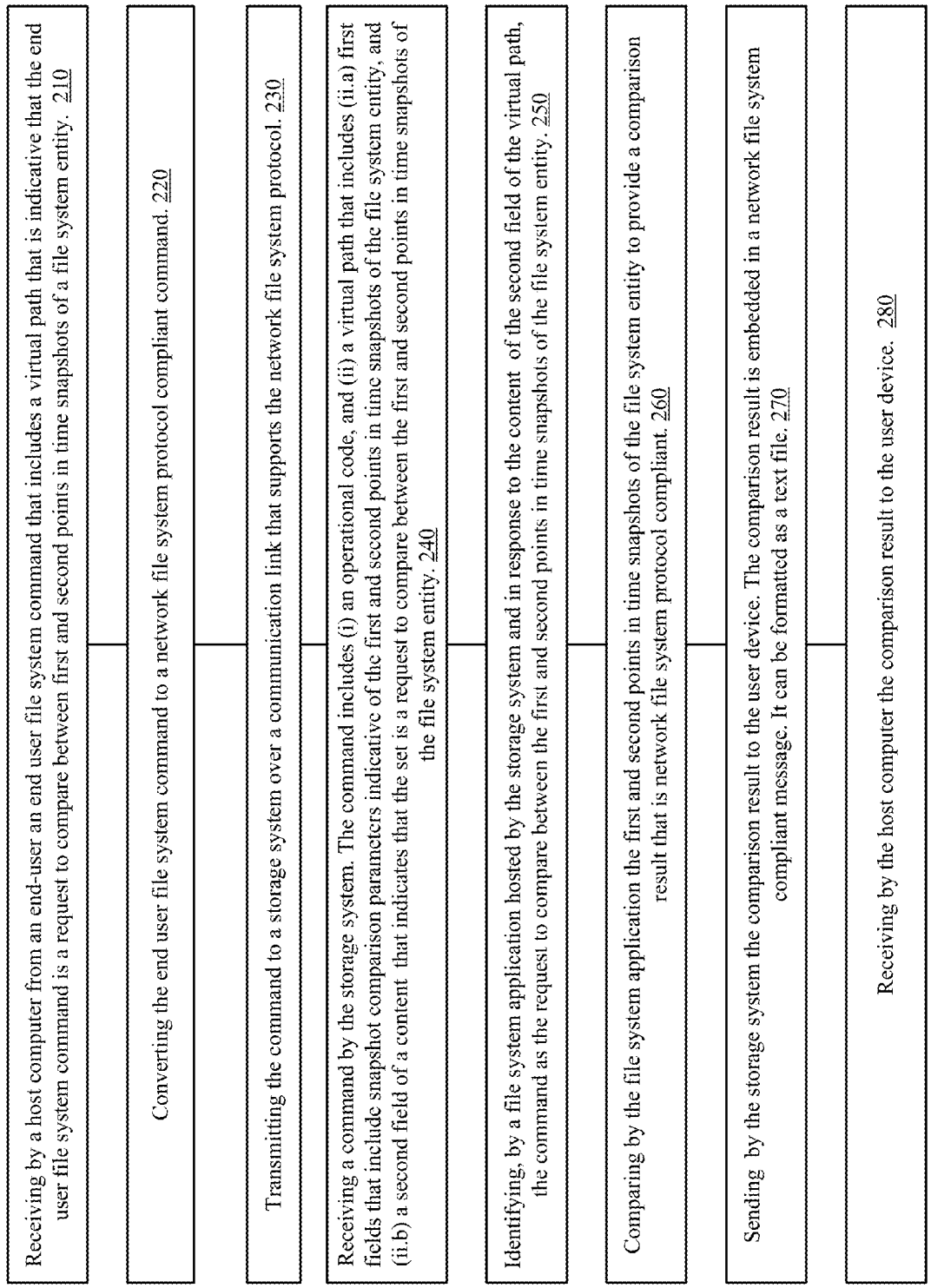
FIG. 2 illustrates a method according to an embodiment of the invention.

FIG. 2 illustrates method 200 according to an embodiment of the invention.

Method 200 is for performing a comparison between first and second points in time snapshots of a file system entity. The file system entity can be the entire file system or a part of the entire file system—one or more directories or sub-directories.

Method 200 starts by stage 210 of receiving by a host computer (of an end-user) an end user file system command that includes information about a virtual path that is indicative that the end user file system command is a request to compare between first and second points in time snapshots of a file system entity. The operation code (opcode) of the end user file system command may differ from a compare snapshot opcode. For example, the operation code of the end user file system command may be "read" (or "cat—if the host computer runs UNIX), which is different from the opcode "snapcomp" that is embedded within the virtual path.

Stage 210 is followed by stage 220 of converting the end user file system command to a network file system protocol compliant command (if the conversion is required).

The operation code of each one of these network file system protocol compliant commands differs from a compare snapshot opcode. The network file system protocol may not support compare snapshot commands and does not include a compare snapshot opcode.

According to an embodiment of the invention the end user file system command can be converted to multiple network file system commands (for example—multiple LOOKUP commands) and the method may include receiving by the storage system multiple commands that were sent from the host computer, each of the multiple commands is network file system protocol compliant, wherein each of the multiple commands comprises an operation code, and wherein the information about the virtual path is distributed between the multiple commands.

Stage 220 is followed by stage 230 of transmitting the network file system protocol compliant command to a storage system over a communication link that supports the network file system protocol.

Stage 230 is followed by stage 240 of receiving the network file system protocol compliant command by the storage system. The command includes (i) an operation code supported by the network file system protocol, and (ii) a virtual path that includes (ii.a) first fields that include snapshot comparison parameters indicative of the first and second points in time snapshots of the file system entity, and (ii.b) a second field of a content that indicates that the command is a request to compare between the first and second points in time snapshots of the file system entity.

Figure 3:
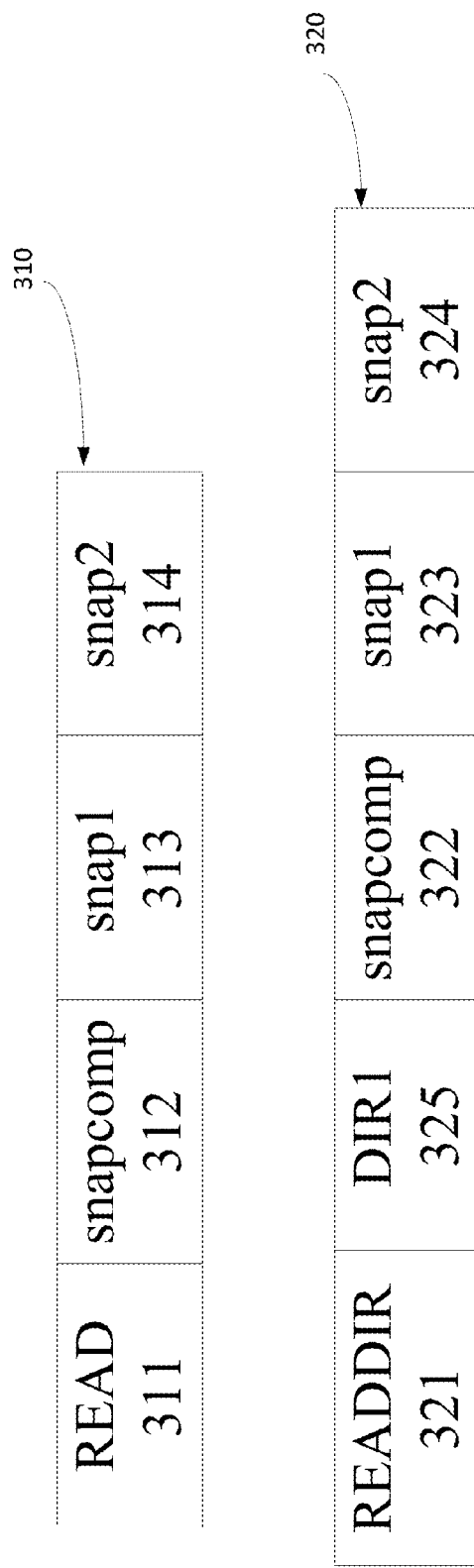
FIG. 3 illustrates various virtual paths according to an embodiment of the invention.

Referring to FIG. 3—command (310) is a read-command of the network file system protocol and it is interpreted as a request to compare between snap1 and snap2 of a file system. The operation code is READ (311), the virtual path is snapcomp/snap1/snap2, the second field is snapcomp (312) and the first fields are snap1 (313) and snap2 (314). In case of using NFS, the elements "snapcomp", "snap1" and "snap2" may be delivered in more than one message over the network (e.g., two lookup messages and one read-message). In this case an entity within the storage system may accumulate the elements.

Referring to FIG. 3—command (320) is a read-directory command and is interpreted as a request to compare between snap1 and snap2 of dir1 of a file system. The operation code is READDIR (321), the virtual path is dir1/snapcomp/snap1/snap2, the second field is snapcomp (322) and the first fields are dir1 (325), snap1 (323) and snap2 (324). The virtual path may further include mount-points indicative of the addressed filesystem.

Referring back to FIG. 2—stage 240 is followed by stage 250 of identifying, by a file system application hosted by the storage system and in response to the content of the second field of the virtual path, the command as the request to compare between the first and second points in time snapshots of the file system entity.

Stage 250 is followed by stage 260 of comparing by the file system application the first and second points in time snapshots of the file system entity to provide a comparison result that is network file system protocol compliant.

Stage 260 is followed by stage 270 of sending by the storage system the comparison result to the user device. The comparison result is embedded in a network file system compliant response message that corresponds to the network file system compliant command. The comparison result can be formatted as a text file.

Stage 270 is followed by stage 280 of receiving by the host computer the comparison result to the user device. The host computer can store the comparison result, display it to the user and the like.

It is noted that if the set of commands received by the storage system is not a request to compare between first and second point in time snapshots of file system entity the method responds to that set of commands as usually—taking into account the operation code.

The invention may also be implemented in a computer program for running on a computer system, at least including code portions for performing steps of a method according to the invention when run on a programmable apparatus, such as a computer system or enabling a programmable apparatus to perform functions of a device or system according to the invention. A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for performing a comparison between first and second points in time snapshots of a file system entity, the method comprises:

receiving by a storage system a command that was sent from a host computer, the command is network file system protocol compliant, wherein the command comprises (i) an operation code, and (ii) information about a virtual path, the virtual path that comprises (ii.a) first fields that comprise snapshot comparison parameters indicative of the first and second points in time snapshots of the file system entity, and (ii.b) a second field of a content that indicates that the command is a request to compare between the first and second points in time snapshots of the file system entity;

identifying, by a file system application hosted by the storage system and in response to the content of the second field of the virtual path, the command as including a request to compare between the first and second points in time snapshots of the file system entity;

comparing by the file system application the first and second points in time snapshots of the file system entity to provide a comparison result that is network file system protocol compliant; and sending by the storage system the comparison result to the host computer.

2. The method according to claim 1 wherein the network file protocol does not comprise a snapshot comparison operation code for requesting a comparison between different points in time snapshots of the file system entity.

3. The method according to claim 1 comprising ignoring the operation code of the command.

4. The method according to claim 1 wherein the comparison result embeds a text file.

5. The method according to claim 1 wherein the file system entity is the file system.

6. The method according to claim 1 wherein the file system entity is a directory of the file system.

7. The method according to claim 1 comprising receiving by the storage system multiple commands that were sent from the host computer, each of the multiple commands is network file system protocol compliant, wherein each of the multiple commands comprises an operation code, and wherein the information about the virtual path is distributed between the multiple commands.

8. A non-transitory computer readable medium that stores instructions that once executed by the computer cause the computer of a storage system to execute the stages of:

receiving a command that was sent from a host computer to a storage system, the command is network file system protocol compliant, wherein command comprises (i) an operational code, and (ii) information about a virtual path that comprises (ii.a) first fields that comprise snapshot comparison parameters indicative of the first and second points in time snapshots of the file system entity, and (ii.b) a second field of a content that indicates that the command is a request to compare between the first and second points in time snapshots of the file system entity;

identifying, in response to the content of the second field of the virtual path, the command as including a request to compare between the first and second points in time snapshots of the file system entity;

comparing by the file system application the first and second points in time snapshots of the file system entity to provide a comparison result that is network file system protocol compliant; and sending the comparison result to the user device.

9. The non-transitory computer readable medium according to claim 8 wherein the network file protocol does not comprise a snapshot comparison operation code for requesting a comparison between different points in time snapshots of the file system entity.

10. The non-transitory computer readable medium according to claim 8 that stores instructions for ignoring the operation code of the command.

11. The non-transitory computer readable medium according to claim 8 wherein the comparison result is embeds a text file.

12. The non-transitory computer readable medium according to claim 8 wherein the file system entity is the file system.

13. The non-transitory computer readable medium according to claim 8 wherein the file system entity is a directory of the file system.

14. The non-transitory computer readable medium according to claim 8 that stores instructions for receiving by the storage system multiple commands that were sent from the host computer, each of the multiple commands is network file system protocol compliant, wherein each of the multiple commands comprises an operation code, and wherein the information about the virtual path is distributed between the multiple commands.

15. A storage system that comprises:
a file system interface that is arranged to receive a command that was sent from a host computer to a storage system, the command is network file system protocol compliant, wherein command comprises (i) an operational code, and (ii) information about a virtual path that comprises (ii.a) first fields that comprise snapshot comparison parameters indicative of the first and second points in time snapshots of the file system entity, and (ii.b) a second field of a content that indicates that the command is a request to compare between the first and second points in time snapshots of the file system entity; and a computer that is arranged to:
identify, in response to the content of the second field of the virtual path, the command as including a request to compare between the first and second points in time snapshots of the file system entity;

compare the first and second points in time snapshots of the file system entity to provide a comparison result that is network file system protocol compliant; and wherein the file system interface is further arranged to send the comparison result to the user device.

16. The storage system according to claim 15 wherein the network file protocol does not comprise a snapshot comparison operation code for requesting a comparison between different points in time snapshots of the file system entity.

17. The storage system according to claim 15 that stores instructions for ignoring the operation code of the command.

18. The storage system according to claim 15 wherein the comparison result embeds a text file.

19. The storage system according to claim 15 wherein the file system entity is the file system.

20. The storage system according to claim 15 wherein the file system entity is a directory of the file system.

21. The storage system according to claim 15 wherein the file system interface may be arranged to receive multiple commands that were sent from the host computer, each of the multiple commands is network file system protocol compliant, wherein each of the multiple commands comprises an operation code, and wherein the information about the virtual path is distributed between the multiple commands.

* * * * *